(12) United States Patent
Thompson

(10) Patent No.: US 11,643,001 B1
(45) Date of Patent: May 9, 2023

(54) VEHICLE MOUNTED THREE WHEELED CYCLE CARRIER WITH TILT LOADING CARRIER PLATFORM

(71) Applicant: Steven Wynn Thompson, Auburn, WA (US)

(72) Inventor: Steven Wynn Thompson, Auburn, WA (US)

( * ) Notice: Subject to any disclaimer, the term of this patent is extended or adjusted under 35 U.S.C. 154(b) by 394 days.

(21) Appl. No.: 17/019,293

(22) Filed: Sep. 13, 2020

(51) Int. Cl.
*B60P 1/28* (2006.01)
*B60P 3/08* (2006.01)
*B60R 9/06* (2006.01)

(52) U.S. Cl.
CPC .................. *B60P 3/08* (2013.01); *B60P 1/28* (2013.01); *B60R 9/06* (2013.01)

(58) Field of Classification Search
CPC .... B60P 1/28; B60P 3/06; B60P 3/062; B60P 3/064; B60P 3/07; B60P 3/08; B60R 9/06; B60R 9/10; B62H 3/00; B62H 3/04; B62H 3/06; B62H 3/08; B62H 3/10; B62H 2700/00
USPC ....... 224/502, 503, 504, 505, 506, 507, 508, 224/523, 524, 924; 410/3; 414/462
See application file for complete search history.

(56) References Cited

U.S. PATENT DOCUMENTS

| | | | | |
|---|---|---|---|---|
| 3,348,713 A * | 10/1967 | Will | .......................... | B60R 9/10 414/462 |
| 3,720,333 A * | 3/1973 | Vaughn | ..................... | B60R 9/10 224/528 |
| 4,189,274 A * | 2/1980 | Shaffer | ...................... | B60R 9/10 224/570 |
| 4,213,729 A * | 7/1980 | Cowles | ...................... | B60R 9/06 224/523 |
| 4,234,284 A * | 11/1980 | Hauff | ......................... | B60R 9/06 224/521 |
| 4,705,448 A * | 11/1987 | Mungons | .................. | B60R 9/10 224/521 |
| 4,934,894 A * | 6/1990 | White | ....................... | B60R 9/06 414/537 |
| 5,052,605 A | 10/1991 | Jphansson | | |
| 5,122,024 A * | 6/1992 | Stokes | ....................... | B60R 9/06 414/921 |
| 5,462,398 A * | 10/1995 | Hymer | ...................... | B60R 9/10 414/537 |
| 5,527,146 A | 6/1996 | Allsop et al. | | |
| 5,833,074 A | 11/1998 | Phillips | | |
| 5,938,395 A * | 8/1999 | Dumont, Jr. | .............. | B60R 9/06 224/504 |
| 6,139,247 A * | 10/2000 | Wright | ...................... | B60R 9/06 414/470 |
| 6,345,749 B1 * | 2/2002 | Hamilton | .................. | B60R 9/06 224/524 |
| 6,485,246 B1 * | 11/2002 | Harkcom | ............. | A01D 75/002 410/3 |
| 6,685,421 B1 * | 2/2004 | Reeves | ................ | B60P 1/4407 414/540 |
| 7,527,282 B2 * | 5/2009 | Gilbert | .................... | B60P 3/122 224/504 |

(Continued)

*Primary Examiner* — Joshua E Rodden

(57) ABSTRACT

A vehicle mounted tricycle carrier with a tilting carrier platform that enables loading a tricycle to the carrier without lifting the tricycle from the ground. The carrier is further enhanced by a lifting boom accessory. The lifting boom may be attached to the tricycle carrier structure and a second platform added to the lift boom allowing two tricycles to be carried.

7 Claims, 6 Drawing Sheets

(56) References Cited

U.S. PATENT DOCUMENTS

| | | | |
|---|---|---|---|
| 7,686,562 B2* | 3/2010 | Panzarella | B60P 1/4421 |
| | | | 414/921 |
| 7,841,821 B2* | 11/2010 | Miro | B60R 9/08 |
| | | | 224/524 |
| 8,141,760 B2 | 3/2012 | Kuschmeader et al. | |
| 8,708,634 B2* | 4/2014 | Mears | B60P 3/36 |
| | | | 414/545 |
| 9,033,641 B1* | 5/2015 | Barefoot | B60P 3/06 |
| | | | 414/462 |
| 9,150,162 B2 | 10/2015 | Shearer et al. | |
| 9,694,758 B1* | 7/2017 | Krolski | B60P 1/28 |
| 10,577,040 B1 | 3/2020 | Goates | |
| 10,668,866 B2 | 6/2020 | Kuschmeader et al. | |
| 2003/0113196 A1* | 6/2003 | O'Leary | B60R 9/06 |
| | | | 414/462 |
| 2004/0191037 A1* | 9/2004 | Potts | B60R 9/06 |
| | | | 414/469 |
| 2008/0206031 A1* | 8/2008 | Butta | B60R 9/06 |
| | | | 254/323 |
| 2012/0125964 A1 | 5/2012 | Suatter et al. | |
| 2016/0068111 A1 | 3/2016 | Walker et al. | |
| 2018/0022286 A1 | 1/2018 | Settlemayer | |

\* cited by examiner

VEHICLE MOUNTED THREE WHEELED CYCLE CARRIER WITH TILT LOADING CARRIER PLATFORM

TECHNICAL FIELD

USPO Classification B60R9/10 Supplementary fittings on vehicles for carrying loads and more specifically carriers for transporting cycles.

BACKGROUND AND PRIOR ART

Three wheeled adult cycles commonly referred to as a tricycle or trikes are becoming increasingly popular. These tricycles have two common design types the classic design being a single front steerable wheel and drive train connected to the back two wheels referred to as a Delta design and the other style being two front steerable wheels and a single rear wheel drive train referred to as a Tadpole design. These Tadpole trikes provide improved stability and readily accommodate recumbent style seating resulting in improved ergonomics, and improved visibility. The general design of frame structure of a tadpole trike results in significant increased load carrying capacity and therefore many of these trikes are purchased with accessories for cargo carry such as racks and panniers and may incorporate electric assist motors that relieves the riders work load.

These ergonomic improvements, cargo carrying capacity and electric assist make these tricycles a popular alternative to the traditional two wheeled bicycle with riders who prefer long distance touring and carry a substantial amount of cargo. They also appeal to recreational riders that prefer leisurely rides at slow pace and may not have the substantial strength and physical condition of a high performing athlete.

These benefits are not without consequence; the fundamental geometry of a tricycle results in it occupying a substantially larger volume of space than a traditional two wheeled bicycle and adds additional weight. The addition of cargo carrying accessories loaded with amenities add weight and the addition of an electric assist is common adding even more weight to the cycle from both the motor and power cell. It is not uncommon to find a fully loaded tricycle, less the rider weight, that weighs in excess of 80 lbs. DHHS (NIOSH) Publication Number 94-110 sets a maximum recommended lift weight of 51 lbs for a single adult under the ideal conditions of the load being less than 7 inches away from the body and not lifted above the chest. In most industry persons lifting loads above a 50 lb weight are required to use assistive devices to prevent injury, or recruit a second person to help lift the object.

It is common for riders to use an automobile to transport their cycle to different locations for use and various carriers have been designed specific to the purpose of tricycle transport; however these carriers predominantly require the tricycle to be physically lifted onto the carrier by a person. The large volume of space occupied by a tricycle makes lifting awkward requiring a lifting position far from the ideal per the NIOSH publication and any non ideal position reduces the maximum recommended lift weight substantially below the 51 lb maximum. Any lifting of a three wheeled cycle should therefore be performed by two persons, or with a lift assisting device. A solo rider transporting a tricycle is at significant risk of serious injury when loading, or unloading a tricycle. Due to the extended reach when loading even when lifted by two persons a substantial risk of injury may exist.

Examples may be found of carriers that support a tricycle from beneath the wheels in a set of hoops, on a platform, or that provide a set of tracks that attach to vehicle receivers and hold a loaded tricycle off the ground several inches to provide road clearance while being transported. An example of this design is the Hitch Rider Trike-N-Bike™ represented by the simplified prior art shown in FIG. 1A.

At least one trike carrier has been designed to facilitate loading a trike by rolling the trike up a set of ramps. An example of this design is the Easy Load™ Easy Load Tray™ represented by the simplified prior art shown in FIG. 1B, however this design only provides two ramps and requires the center wheel to be lifted. Failing to provide a center ramp is a serious short coming. Often the center wheel of a tadpole style trike is heavily loaded with carrier racks and panniers that may be filled with articles. Trikes often incorporate an electric drive motor and battery for assistive power adding additional weight to the center wheel. The ramps of the Easy Load Tray carrier are separate attachments requiring positioning and attachment for use, then detachment for transport and consume additional space for stowage when not in use.

Many recreational riders prefer to ride with a companion. Most prior art racks do not have capacity for a second tricycle limiting transport to a single trike thus limiting the possibility for a riding companion. One solution for carrying a second trike that is often utilized is a folding version of trike. These folding trikes provide a substantial reduction in the space volume of each trike and may allow stowage of two tricycles in a single vehicle, or one in the vehicle and another on an external carrier device. An example of a folding tricycle is the Cat Trike 5.5.9 ™, represented by the simplified prior art shown in FIG. 1C. while this may allow for a second cycle to be transported inside the vehicle it fails to address the weight lifting risks and has a negative consequence of the time and effort required to unload and break down the cycle into its folded state for each transport and then reconstruct the cycle and load it for each use.

A few prior art carriers provide for transport of two trike; however one type orients the tricycles in a vertical orientation with the steerable wheels raised upward an example of this type of carrier is the Alpaca Carriers, inc model 1500 2Tadpole2 ™ represented by the simplified prior art shown in FIG. 1D, or another configuration places the tricycles one above the other in a horizontal orientation, an example of this type carrier is the Hitch Rider Double Decker Model™ represented by the simplified prior art shown in FIG. 1E, both of these double trike carrier designs fail to provide mechanisms to assist in getting the tricycle loaded requiring a person to lift the full weight of a trike a significant height and requiring substantial extension of reach in ergonomically poor body positions at a great risk of injury.

SUMMARY OF INVENTION

This disclosure is for a tricycle carrier configured to connect to a vehicle hitch receiver. The carrier provides a tilting platform that rotates to contact the ground due to a center of gravity offset from a pivot axis creating an inclined ramp. The tricycle is rolled up the inclined platform to a point that the tricycle center of gravity overcomes the platform center of gravity causing the platform to rotate to a level to the ground orientation. This enables a single person to quickly load a tricycle without lifting the tricycle, substantially reducing risk of injury to the person.

An optional accessory lift mechanism with an additional platform connected may be attached to the carrier allowing a tricycle to be loaded by a single person onto the additional platform without lifting the tricycle and then the tricycle raised to a position above the first platform allowing a tricycle to be loaded onto the lower platform.

While this disclosure demonstrates use of the carrier for a tricycle of a tadpole design with two steerable wheel forward and a single drive wheel in the rear any embodiment readily accommodates any three wheeled cycle, including but not limited to a traditional design tricycle with a single steerable wheel forward and two rear wheels, or a hand pedal tricycle commonly ridden by persons with limited use of their legs.

EMBODIMENT 1

Embodiment 1 is one possible aspect of a tricycle carrier with a tilting bed to facilitate loading, and optional lift accessory to enable loading and carrying two tricycles at the same time. This embodiment provides specific detail of all essential features and functionalities of the concept for the purposes of disclosure of operating principles and structural concepts. It will be apparent to those skilled in the art that various changes in form, detail and materials may be made without departing from the spirit and scope of the disclosure. This disclosure is not intended to limit the concept to a specific embodiment and the embodiment should not be interpreted as more or less significant as other possible embodiments.

Detail Description of Embodiment 1

FIG. 2

Figure 1A:
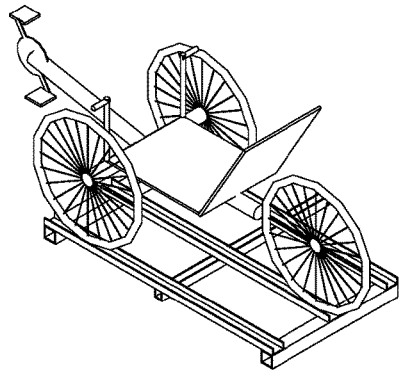
FIG. 1A shows a simplified conceptual prior art fixed platform single tricycle carrier with a tricycle loaded.
Figure 1B:
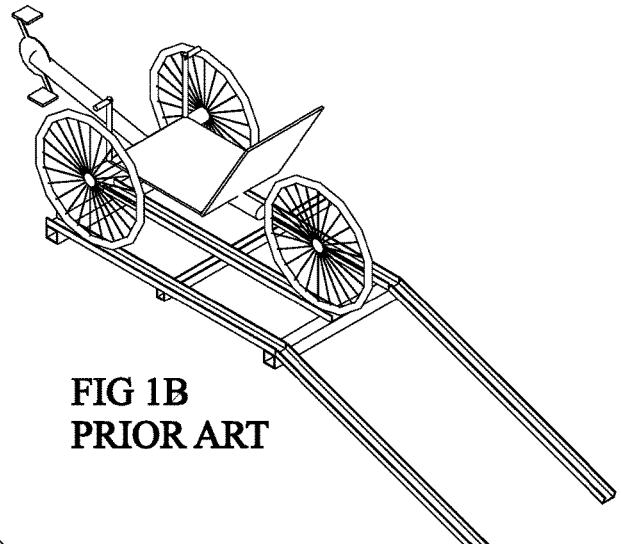
FIG. 1B shows a simplified conceptual prior art fixed platform single tricycle carrier with ramps and a tricycle loaded.
Figure 1C:
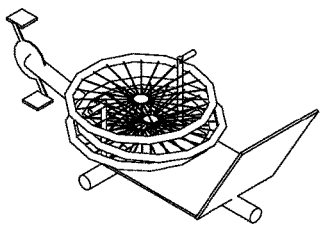
FIG. 1C shows a simplified conceptual prior art folding tricycle as might be loaded into a vehicle.
Figure 1E:
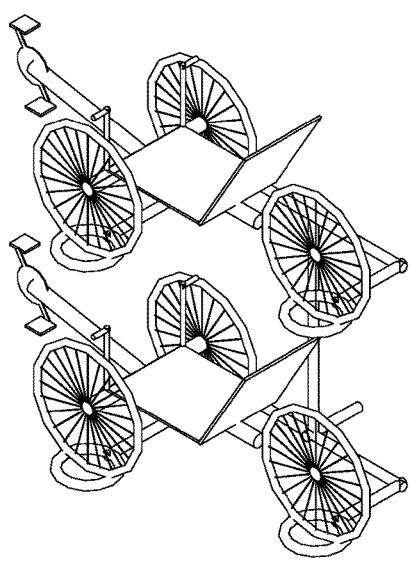
FIG. 1E shows a simplified conceptual prior art double tricycle carrier with two tricycles oriented one above the other.
Figure 1D:
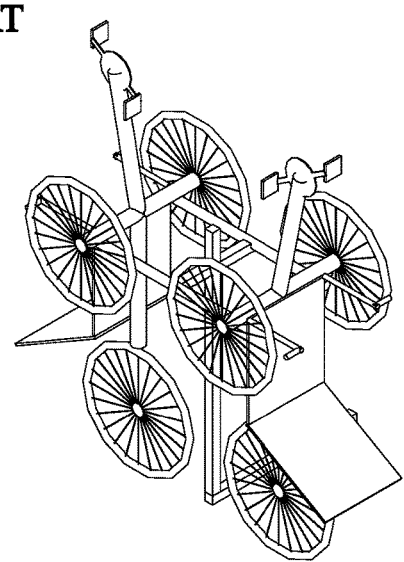
FIG. 1D shows a simplified conceptual prior art double tricycle carrier with two tricycles hanging in a vertical orientation.
Figure 2:
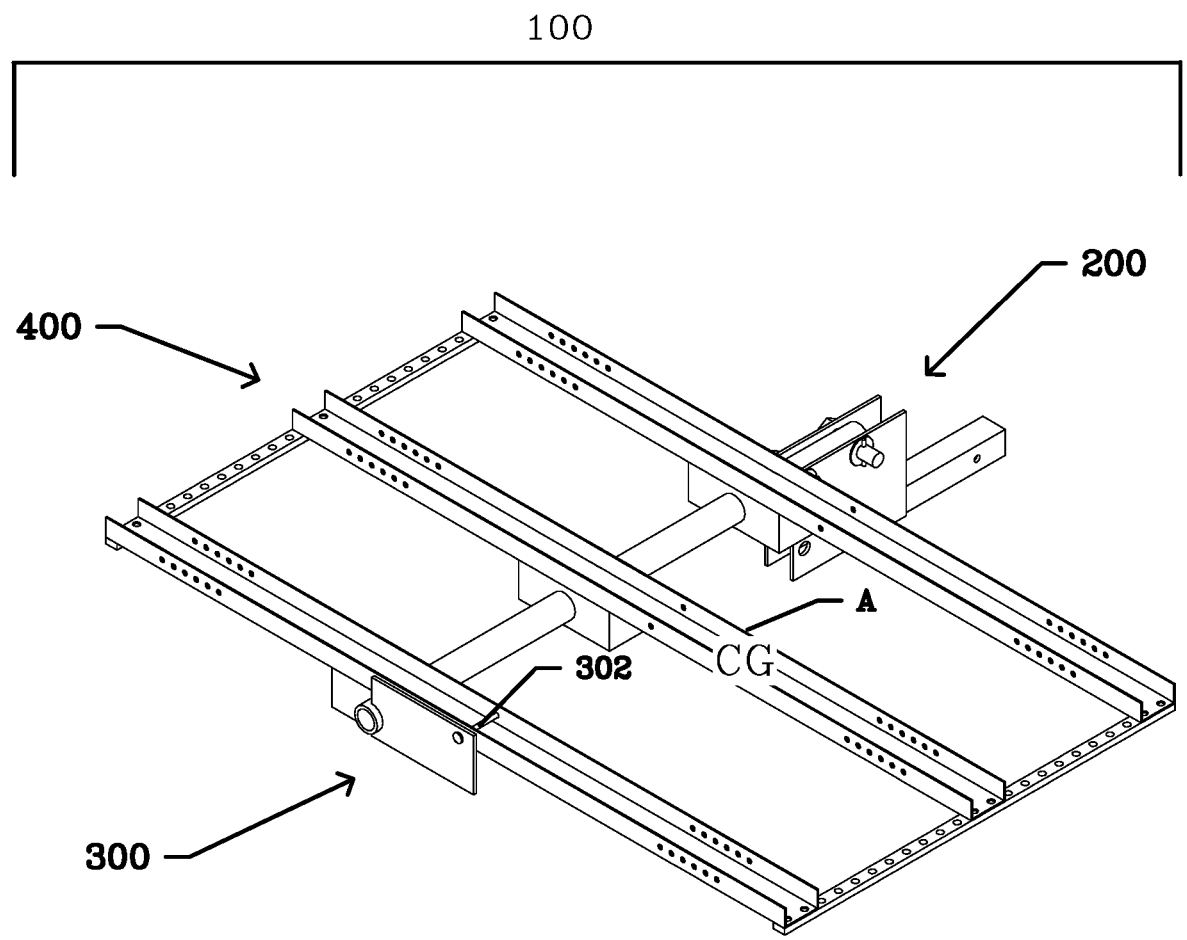
FIG. 2 is a perspective view of one embodiment of a Single Tricycle Carrier Assembly in a transport position identifying a Tongue Member Subassembly, a Carrier Beam Subassembly and a Platform Subassembly.

FIG. 2 is an assembly level drawing showing Single Tricycle Carrier Assembly 100 in a deployed for transport state. The majority of detailed components are omitted to aid in clarity. The omitted components are shown in following FIGS. and described in detail in the associated sections of this specification.

FIG. 2 further shows Tongue Member Subassembly 200 having a distal end portion and proximal end portion the proximal end portion being configured for connecting to a vehicle hitch receiver, Platform Carrier Beam subassembly 300 having a distal end and proximal end the proximal end being pivotably connected to the distal end of Tongue Member subassembly 200. Platform subassembly 400 is pivotably connected to Platform Carrier Beam Subassembly 300. Platform Subassembly 400 has a rotational axis perpendicular the sides of the Platform, parallel the bottom of the Platform, aligned with the length of Tongue Member Subassembly 200 and located offset to Platform 400 center of gravity (indicated by the letter A). The offset of rotational axis of the platform from the platform center of gravity causes rotation in a clockwise direction of an empty platform when viewed from the distal end of the Platform Carrier Beam Subassembly.

Platform 400 length extends past the rotational axis on the side opposite to the platform center of gravity a minimum of a distance sufficient to position the center of gravity of a loaded tricycle above a lever arm sufficient for generating a counter rotational force greater than the empty platform rotational force.

Platform Subassembly 400 is secured in a transport position by Securing Pin 302 inserted through coordinating holes in Platform Carrier Beam Subassembly 300 and Platform Subassembly 400.

FIG. 3A

Figure 3A:
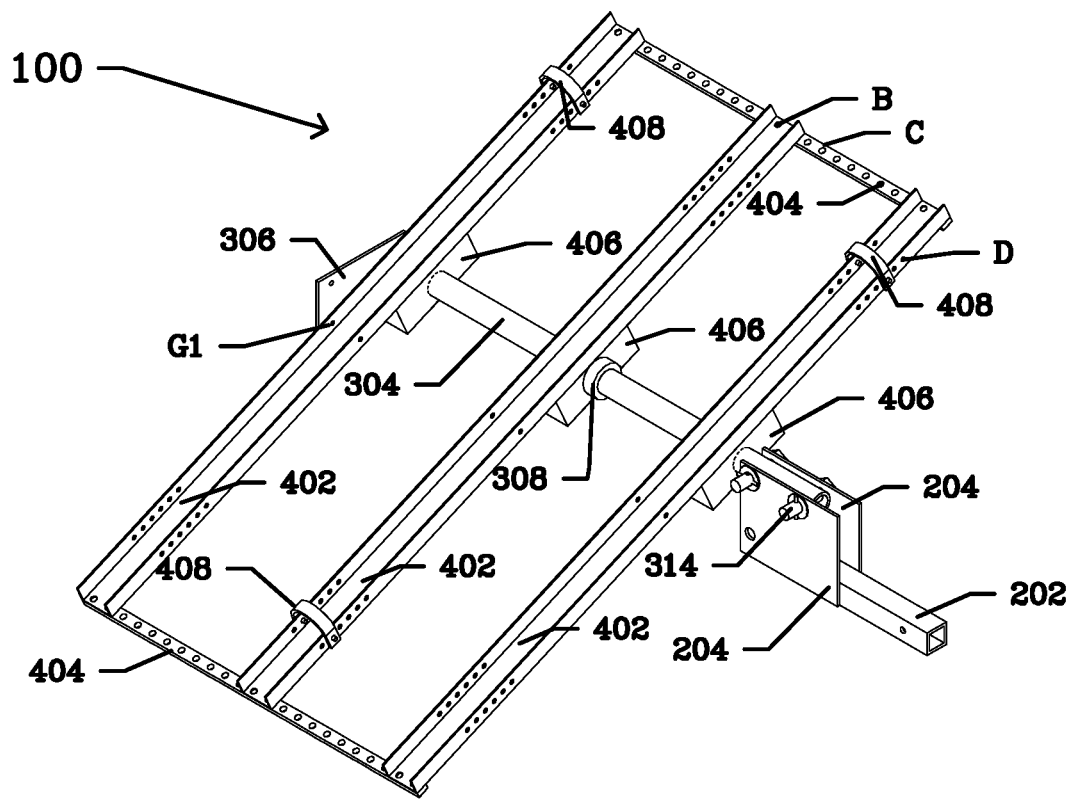
FIG. 3A is a perspective view of the Single Tricycle Carrier in a loading position and identifies detail components for the Tongue Member Subassembly, Platform Carrier Beam Subassembly and Platform Subassembly.

FIG. 3A shows detail components for Single Tricycle Carrier Assembly 100. Tongue Beam 202 is shown having a long axis of predetermined length with a distal end portion and proximal end portion the proximal end portion being of a square cross sectional geometry having a top edge, a bottom edge, and two side edges with the proximal end portion being configured for attachment to a vehicle hitch receiver. Two elements of Support Member 204 are shown of rectangular shape of predetermined length and width symmetrically attached to opposing outside surfaces of the distal portion of Tongue Beam 202 located with one long edge in alignment with the lower edge of Tongue Beam 202 and one short edge extended a predetermined distance past the distal end of Tongue beam 202.

Three identical Track 402 elements are shown being of a predetermined length having a cross section of two symmetrical sides of predetermined height perpendicular to and separated by a bottom of predetermined width. A series of equally spaced holes D are shown on each Track 402 along each side of each Track. Holes D start a predetermined distance from both end of the tracks progressing towards the track center. Two holes B pass through the bottom surface of track 402 near both ends of the track oriented along a line perpendicular the track length. The holes being separated by a predetermined distance identified throughout this disclosure as 'SD402'.

Two elements of Strut 404 of predetermined cross section and length are shown with a series of holes C separated by distance 'SD402' along the full length of the strut.

The track 402 elements are adjustably connected to strut 404 elements with common threaded fasteners secured through aligned holes B and C with all track bottoms in a common plane; all track sides parallel and at least one end of all tracks in alignment.

Note: The described mechanism used to connect tracks 402 and struts 404 through aligned holes B and C for adjustably connecting the tracks and struts is one possible design provided for the purpose of this disclosure and not intended to limit the design to a specific mechanism.

Three Pivot block 406 elements are shown of predetermined length, width and height with a bore of a diameter determined by Carrier Beam 304 with cylindrical axis perpendicular to and located on the center of the surface defined by the length and height.

One pivot block 406 element is attached to the bottom surface of each track 402 with the bore cylindrical axis perpendicular to the track sides, parallel the track bottom and located offset of Platform Subassembly 400 Center of Gravity Point A (shown in FIG. 2).

Deployment pin 314 is shown passing through Support Member 204 and a hole in the proximal end of the Platform Carrier Beam Subassembly 300.

Hole G1 of a diameter determined by Securing pin 302 is shown in the sides of each track located by a radial distance referred to throughout this disclosure as 'RDPin302' originating at the center point of the bore in Pivot Block 406 and the intersection of a line parallel track 402 bottom at half the height of the track sides. Hole G1 being located in a direction towards the center of gravity A.

Collar 308 is shown on Platform Carrier Beam Subassembly 300 and adjacent one Pivot Block 306 securing Platform Subassembly 400 from movement along the beam assembly cylindrical axis.

Straps 408 being made of an elastic material of predetermined length are shown on a common end of both outer track 402, and one strap on the opposite end of the center track 402, the straps being adjustably connected to the respective track at one selected hole D and secured across the tracks to an aligned hole D on the opposite track side.

FIG. 3B

Figure 3B:
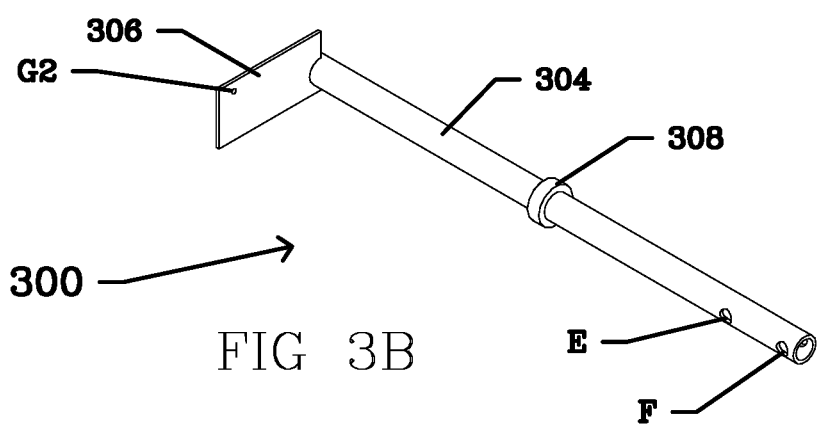
FIG. 3B is a perspective view of the Platform Carrier Beam Subassembly indicting hole locations for connection to the Tongue Member Subassembly.

FIG. 3B shows Carrier Beam Subassembly 300, carrier beam component 304 having a circular cross section of a predetermined diameter, a predetermined length and a proximal and distal end, the proximal end being configured for attachment to the distal end of Tongue Member Subassembly 200.

Carrier Beam 304 is shown having line bore E of a predetermined diameter with cylindrical axis perpendicular to and intersecting the cylindrical axis of Carrier Beam 304 at a predetermined distance from the proximal end of the Carrier Beam.

Bore F is of a diameter determined by Deployment Pin 314 with a cylindrical axis parallel the cylindrical axis of Bore E intersecting the Carrier Beam cylindrical axis in the proximal direction from Bore E at radial distance 'RDPin314' originating from the center of Bore E.

Latch Plate 306 is shown being of rectangular geometry of predetermined length and width having a semi circular cut out with radius of one half of Carrier Beam 304 diameter centered at a point defined by one short edge and offset along the short edge from the midpoint of the short edge a predetermined distance. Latch Plate 306 is shown attached to Carrier Beam 304 with the semi circular cutout in perpendicular alignment to and centered on the cylindrical axis of Carrier Beam 304 at a predetermined distance from the distal end of the carrier beam, the Latch Plate long edges being parallel the cylindrical axis of bore F, the latch plate extending to the right and the semi circular cut out center being offset downward when viewed from the distal end of Carrier Beam 304.

Hole G2 shown on the face of Latch Plate 306 is of a diameter determined by Securing Pin 302 (shown in FIG. 2) and located on radius 'RDpin302' originating from the center of the semicircular cutout of Latch Plate 306 and intersecting a line running parallel the latch Plate top at half the height of track 402 from the latch plate top.

FIG. 4A

Figure 4A:
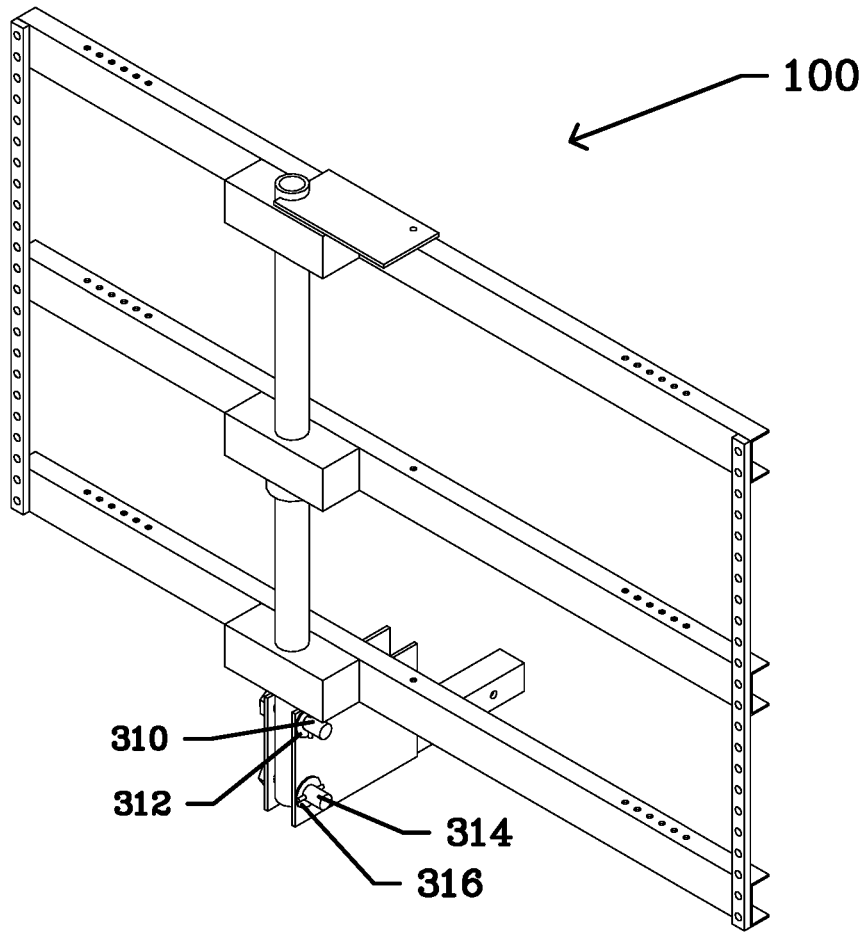
FIG. 4A is a perspective view of the Single Tricycle Carrier in a stowed position and identifies detail components for connection between the Tongue Member Subassembly and the Platform Carrier Beam Subassembly.

FIG. 4A shows Single Tricycle Carrier Assembly 100 in a stowed position. Carrier Beam Pivot Shaft 310 and Carried Beam Thrust Washer 312 are shown connecting Platform Carrier Beam Subassembly 300 to Tongue Member Subassembly 200. Deployment Pin 314 and Deployment Thrust washer 316 are shown securing Single Tricycle Carrier Assembly 100 in the stowed position.

FIG. 4B

Figure 4B:
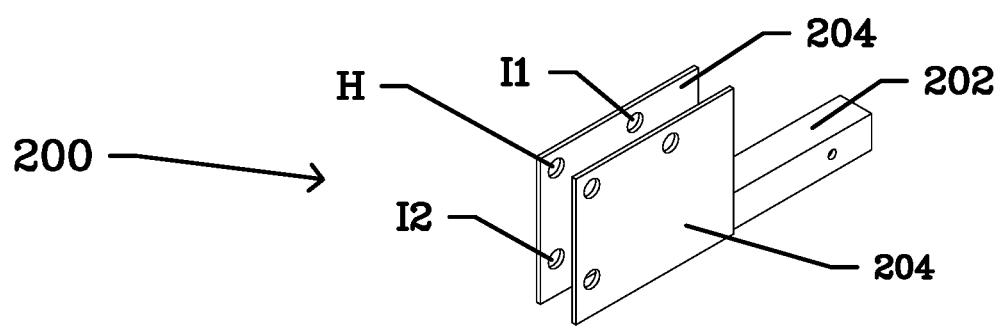
FIG. 4B is a perspective view of the Tongue Member Subassembly indicating hole locations for connection between the Platform Carrier Beam Subassembly and the Tongue Member Subassembly.

FIG. 4B shows Tongue Member Subassembly 200 with Platform Carrier Pivot Bore H of a diameter determined by the diameter of Carrier Beam Pivot Shaft 310 located in Support Member 204 at a predetermined height from Tongue Beam 202 top surface and a predetermined distance from Tongue Beam 202 Distal End. Bore I1 and Bore I2 of a diameter determined by Deployment pin 314 are located by radial distance 'RDpin314' originating from the center of Bore H and Bore I1 being located at the 3:00 position and I2 located at the 6:00 position.

FIG. 5

Figure 5:
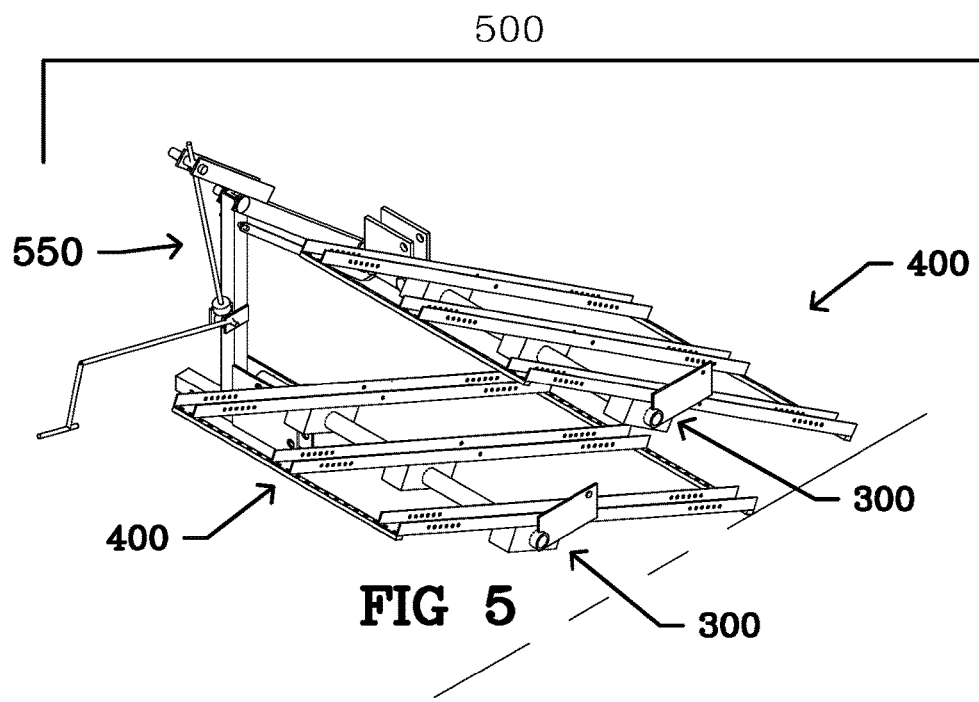
FIG. 5 is a perspective view of one embodiment of a Double Tricycle Carrier Assembly in a loading position identifying a Lift Subassembly, two Platform Subassemblies and two Platform Carrier Beam Subassemblies.

FIG. 5 shows one embodiment of a Double Tricycle Carrier Assembly 500 in a loading position. A phantom ground reference line is shown to aid in understanding. Two Platform Subassembly 400 are shown released from a respective Platform Carrier Beam Subassembly 300 and rotated to make contact with the ground. Lift Assembly 550 is positioned a predetermined distance from the distal end of Tongue Member Subassembly 200.

FIG. 6A

Figure 6B:
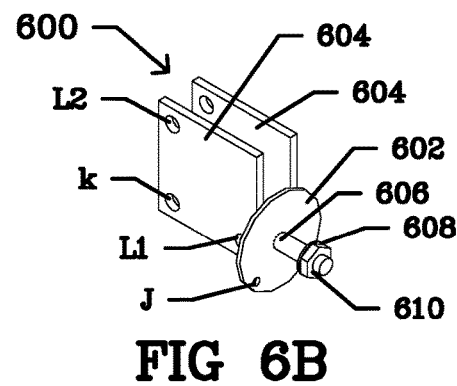
FIG. 6B is a perspective view of a Platform Attachment Fitting Assembly identifying detail components and indicating the Platform Carrier Beam Subassembly connection hole locations.
Figure 6A:
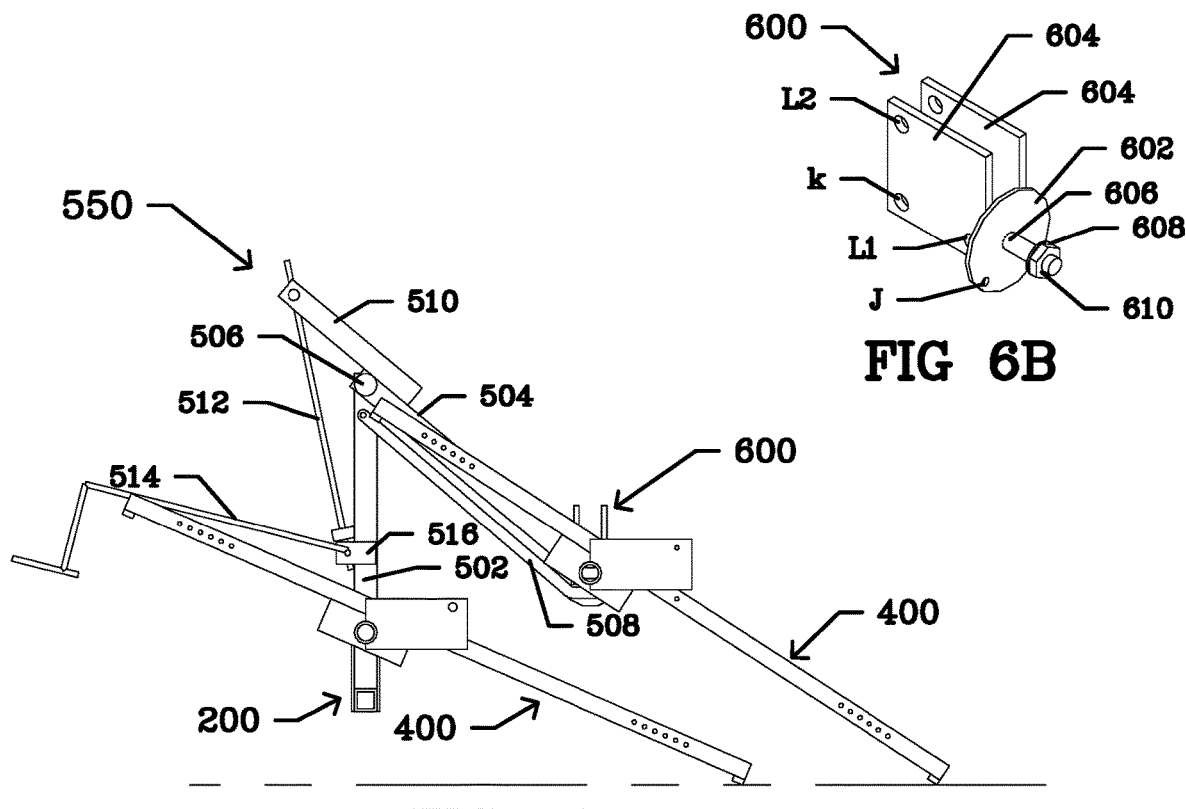
FIG. 6A is an orthographic face view of the Double Tricycle Carrier Assembly in the loading position and identifies detail components of the Lifting Subassembly.

FIG. 6A is an orthographic face view of the Double Tricycle Carrier Assembly 500 in a ready for loading position. Lift Assembly 550 is shown having the following components: Mast 502 of a predetermined length and square cross section with one end attached to Tongue Beam 202 with length in an upright orientation, Boom 504 of a predetermined length and square cross section pivotally connected on one end to the top of Mast 502 by Boom Pivot Shaft 506. Boom 504 has a pivotal axis parallel to the long axis of Tongue Member Subassembly 200.

Platform Attachment Fitting Assembly 600 (shown in FIG. 6B) is pivotally connected to the free end of boom 504 by Fitting Pivot Shaft 606 with a pivotal axis passing through the center line of Back Plate 602 perpendicular to the back plate face and parallel the pivotal axis of boom 504. The Platform Attachment Fitting Assembly is secured to Boom 504 by placing Fitting Thrust Washer 608 over the end of Fitting Pivot Shaft 606 and threading Fitting Nut 610 onto the Fitting Pivot Shaft.

Linkage 508 of predetermined cross section, a predetermined length and predetermined geometry is connected between Mast 502 and Back Plate 602 causing Platform Attachment Fitting Assembly 600 to rotate concurrent with, proportional to and counter to the rotation of boom 504 and constraining rotation of attachment fitting assembly 600 relative to rotation of Boom 504 to a predetermined angular displacement.

Jack Beam 510 is of a common channel cross section of a predetermined length and attached with the sides of the channel facing away from Boom 504 and the Jack Beam end overlapping the end of Boom 504 by a predetermined distance.

Jack Screw 512 and Hand Crank 514 are of design readily recognizable by a person skilled in the art. Jack Screw 512 is shown with the gear drive end connected to Jack Pivot Plates 516. Jack Pivot Plates 516 are attached at a predetermined height along Mast 502 and the jack screw threaded shaft is connected to the free end of jack Beam 510. Jack Screw 512 being sized to provide a force greater than the sum of forces caused by a typical tricycle, typical provisions, the weight of all additional mechanisms and all components expected to be suspended from the free end of boom 504 multiplied by the mechanical leverage of boom 504. Jack Screw 512 travel is of a length sufficient to cause boom 504 to rotate between a predominantly downward orientation and a fully upright orientation relative to Mast 502. Hand Crank 514 is shown removably connected to Jack Screw 512.

Note: The described mechanism of Lift Assembly 550 described above and shown in FIG. 6A is one possible embodiment of a lift mechanism provided for the purpose of demonstrating the fundamental concept and operations of one possible lifting attachment design for the purpose of disclosure and not intended to limit the lift attachment design to a specific mechanism.

FIG. 6B

FIG. 6B shows Platform Attachment Fitting Assembly 600 and indicates location of holes for connection of Platform Carrier Beam Subassembly 300 and Linkage 510. Back Plate 602 is shown of predetermined diameter with Fitting Pivot Shaft 606 passing through center. Two Flanges 604 are shown attached perpendicular to Back Plate 602 symmetrically positioned at equal distances from the center point of the back plate and configured for connection of the proximal end of carrier beam sub assembly 300. Back Plate 602 is shown with linkage attachment hole J in the Back Plate face located by a predetermined radius originating from the center of the back plate face in an approximately 5:00 position relative to flanges 604 when viewed from the Flange 604 face side. Bore K is of a predetermined diameter passing through both flange 604 component, perpendicular to the flange faces, offset downward towards the 6:00 direction a predetermined distance from base plate 602 centerline and at a predetermined distance from the face of base plate 602.

Two line bore holes L1 and L2 of a diameter determined by Deployment Pin 314 pass through flanges 604, both holes are positioned on the flange faces by radial distance 'RDpin314' originating at the cylindrical axis of bore hole K, hole L1 positioned on a line perpendicular to the back plate at a 3:00 position, hole L2 located in a 12:00 position.

FIG. 7

Figure 7:
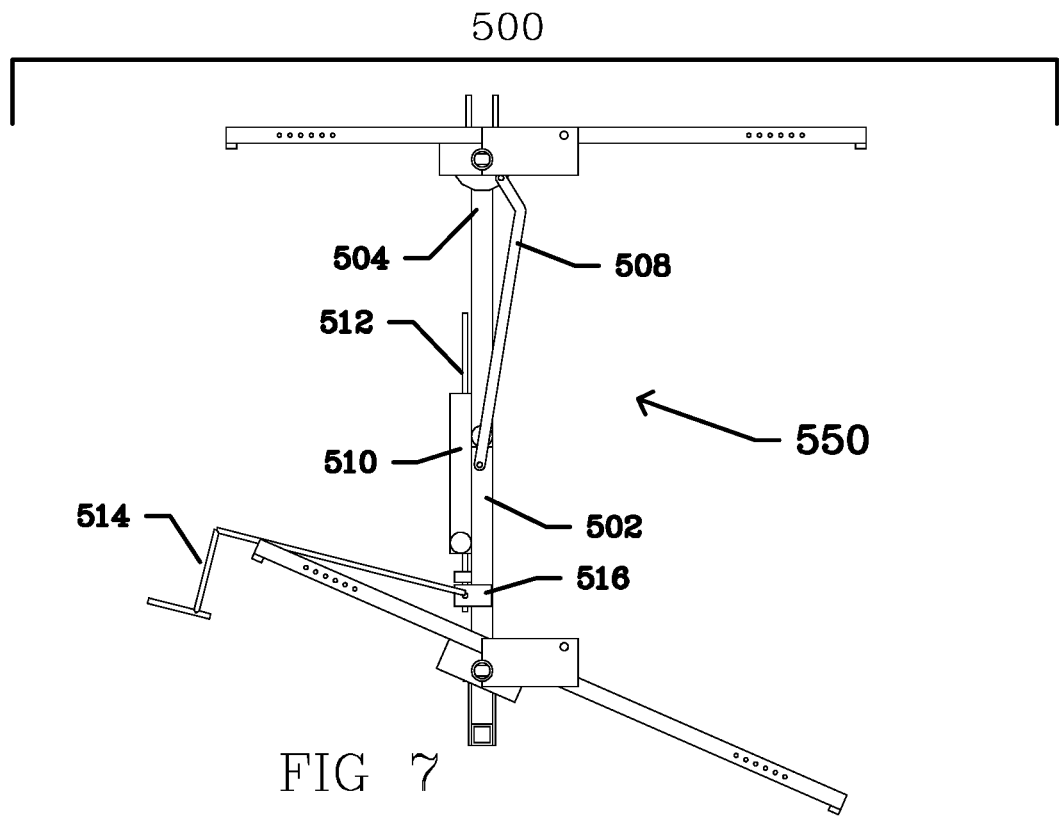
FIG. 7 is an orthographic face view of the Double Tricycle Carrier Assembly with the upper Platform Assembly raised.

FIG. 7 is an orthographic face view showing Double Tricycle Carrier Assembly 500 with Hand Crank 514 removably connected to Jack Screw 512 of Lift Assembly 550. The Double Tricycle Carrier Assembly is in a position with the upper platform fully raised and the lower platform in a loading position.

FIG. 8

Figure 8:
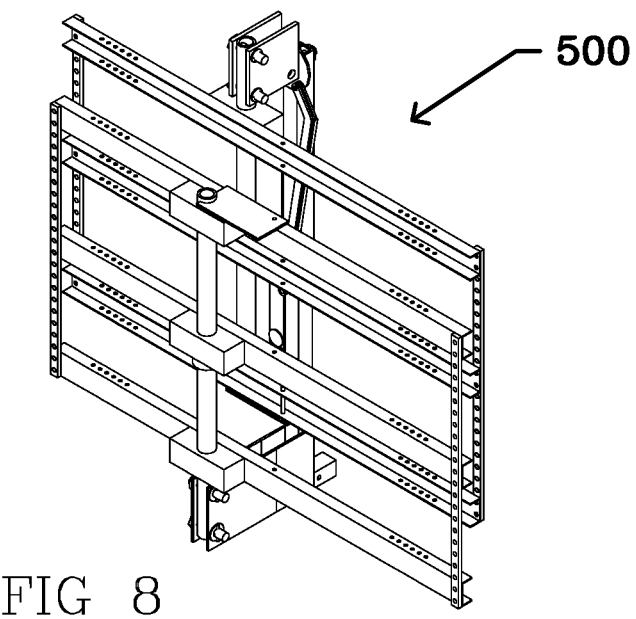
FIG. 8 is a perspective view of the Double Tricycle Carrier in a stowed state.

FIG. 8 is a perspective view showing Double Tricycle Carrier Assembly 500 with both platforms stowed.

Operational Concept

Single Trike Carrier Assembly 100

When configured as shown in FIG. 2 Tricycle Carrier Assembly 100 enables one person to quickly load a fully loaded tricycle for transport without lifting the tricycle off the ground by deploying Platform Subassembly 400 by removing Deployment Pin 314 from hole I2 of the Support Members of Tongue Member Subassembly 200, rotating Platform Carrier Beam Subassembly 300 to a horizontal orientation, and securing it in the horizontal plane by insertion of Deployment Pin 314 into hole I1 in Support Members 204 and through Carrier Beam 302 Bore F. Separations of tracks 402 are adjusted to match a selected tricycle wheel base along strut member 404 by selection of appropriate coordinating holes B and C. Securing pin 302 is removed releasing Platform Subassembly 400 from Platform Carrier Beam Subassembly 300 allowing forces acting on the platform center of gravity to rotate the track ends to contact the ground. A tricycle is rolled onto the platform until the forces acting on the tricycle center of gravity cause the track ends to raise. Platform Subassembly 400 is secured to Platform Carrier Beam Subassembly 300 by inserting Securing pin 302 through holes G1 and G2. The loaded tricycle is secured to the platform by attaching straps 408 at a selected hole D in proximity of each wheel lower quadrant, passing the straps through the spokes and connecting the straps to the opposite side of the tracks at the corresponding hole D.

Double Trike Carrier Assembly 500

When configured as shown in FIG. 5 Double Tricycle Carrier Assembly 500 enables one person to load two fully loaded tricycle for transport by deploying the first (lower) platform 400 as described above for Single Tricycle Carrier 100, removing Deployment Pin 314 from Platform Attachment Fitting assembly 600 flanges and rotating the second (upper) Platform Subassembly 400 to a horizontal plane and inserting Deployment Pin 314 into flange hole L1 and through Carrier Beam 302 bore F securing the Platform in the deployed position.

Securing pin 302 is removed from the lower Carrier Beam 300 subassembly Latch Plate 306 releasing the lower Platform allowing the track ends to rotate and contact the ground.

Hand Crank 514 is then connected to Jack Screw 512, turning Hand Crank 514 activating Jack Screw 512 in a manner that lowers Boom 504 to proximity of the ground. The upper platform is released by removing Securing Pin 302 allowing the track ends to contact the ground. A tricycle is rolled onto the upper platform causing the track ends to raise. Pin 302 is inserted through latch plate hole G2 and through hole G1 of the adjacent track securing Platform Subassembly 400 to Carrier Beam sub assembly 300. The tricycle is secured to the platform with Straps 408 being located in proximity of the lower quadrant of each wheel as described for the single tricycle carrier assembly. Hand Crank 514 is turned activating jack screw 512 in a manner that raises the platform to its maximum height. The lower platform may then be loaded with a second trike as described in the single tricycle carrier assembly operations.

LISTING OF COMPONENTS:

| Component number | Component Name |
|---|---|
| 100 | Single Tricycle Carrier Assembly |
| 200 | Tongue Member Subassembly |
| 202 | Tongue Beam |
| 204 | Support Member |
| 300 | Platform Carrier Beam Subassembly |
| 302 | Securing Pin |
| 304 | Carrier Beam |
| 306 | Latch Plate |
| 308 | Collar |
| 310 | Carrier Beam Pivot Shaft |
| 312 | Carrier Beam Thrust Washer |
| 314 | Deployment Pin |
| 316 | Deployment Thrust Washer |
| 400 | Platform Subassembly |
| 402 | Track |
| 404 | Strut |
| 406 | Pivot Block |
| 408 | Strap |
| 500 | Double Tricycle Carrier Assembly |
| 502 | Mast |
| 504 | Boom |
| 506 | Boom Pivot Shaft |
| 508 | Linkage |
| 510 | Jack Beam |
| 512 | Jack Screw |
| 514 | Hand Crank |
| 516 | Jack Pivot Plate |
| 550 | Lift Assembly |
| 600 | Platform Attachment Fitting Assembly |
| 602 | Back Plate |
| 604 | Flange |
| 606 | Fitting Pivot Shaft |
| 608 | Fitting Thrust Washer |
| 610 | Fitting Nut |

CONCLUSIONS, RAMIFICATIONS AND SCOPE

Embodiment 1 or an alternative embodiment provide advantages of
a. Reduced risk of injury from lifting a trike and any artifacts and accessories loaded onto the trike.
b. Ability to carry two trikes at the same time.
c. Easy loading by one person of one or two trikes.
d. Conservation of rider's time by not requiring unloading of artifacts from the trike and folding the trike for the purposes of transport then unfolding the trike and loading of artifacts onto the trike for the purpose of riding.

The following alternative embodiments may readily be envisioned without the aid of drawings and are of substantially the same mechanical concept, same functionality and same principles of operation as embodiment 1.

Various Embodiments may be designed with changes to structural geometries and materials achieving substantially the same operational principles and concepts.

Various Embodiments may be designed with a variety of different means for securing a tricycle to the platform including but not limited to mechanical clamps, or straps attached to the carrier in any location enabling a constraining force to be applied to a point of contact on a loaded tricycle.

Various Embodiments may be designed using different means for generating a lifting force these may be manually, or power activated, and includes but is not limited to hydraulic rams, pneumatic cylinders, springs and levers.

Various Embodiments may be designed using different mechanisms other than a boom for raising, or lowering the upper platform; including but not limited to cables, tracks, telescoping masts and movable beams.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a", "a first", or another element, or the equivalent thereof, it should be interpreted to include one or more of such elements. Furthermore, any aspect shown or described with reference to a particular embodiment should be interpreted to be compatible with any other embodiment, alternative, or variance.

I claim:

1. A vehicle mounted tricycle carrier comprising:
a) a tongue member having a long axis of predetermined length with a distal end portion and proximal end portion, said proximal end portion being configured for attachment to a vehicle hitch receiver;
b) a carrier beam member having a predetermined cross section and a long axis of predetermined length with a distal end portion and proximal end portion, the proximal end portion being pivotally connected to the distal end portion of said tongue member, wherein the carrier beam member being able to pivot upward relative to a lower edge of the proximal end portion of the tongue member between an orientation generally parallel the long axis of the tongue member and generally perpendicular to the long axis of the tongue member;
c) a carrier platform comprising a plurality of tracks of a predetermined length and cross section, and a plurality of strut members of a predetermined cross section and length, wherein the strut members being connected to the tracks in a position with all track bottom surfaces lying in a common plane, all track sides in parallel, and said tracks adjustably separated along said struts;
d) means for pivotally connecting said carrier platform to said carrier beam member along a rotational axis aligned to the long axis of the carrier beam member, the rotational axis oriented perpendicular to the track sides, parallel the track bottom surfaces and offset to a platform center of gravity a predetermined distance, said carrier platform extending past the rotational axis on a side opposite to the platform center of gravity a predetermined distance that positions a center of gravity of a tricycle past the rotational axis wherein generating a counter rotational force greater than an empty carrier platform rotational force, whereby track ends of the empty carrier platform are configured to rotate downward under the force of gravity, rotation stopping when the track ends contact ground in an inclined orientation, enabling the tricycle to be rolled along the tracks when inclined to a distance past the rotational axis, whereby the rotational force acting on the platform due to the center of gravity of the tricycle exceeds the rotational force due to the center of gravity of the platform being offset causing the track ends of the platform to rotate upward;
e) means for securing said carrier platform to the carrier beam member, wherein preventing rotation between the carrier platform and the carrier beam member with said platform secured in an orientation with the length of the tracks generally parallel a pivotal axis of the proximal end portion of the carrier beam member;

f) means for securing said carrier beam member in a generally parallel alignment to the long axis of said tongue member, or alternatively in a generally perpendicular orientation to the long axis of said tongue member, whereby the carrier platform is configured to be stowed in a reduced area relative to the ground by an upward rotation of said carrier beam member and securing the carrier beam member in an upright position, or alternatively the platform is configured to be deployed for use by securing the carrier beam member in a parallel orientation to the long axis of the length of the tongue member;

g) means for securing the tricycle to the carrier platform.

2. The tricycle carrier of claim 1, wherein the tongue member having a beam of predetermined length with the proximal end portion and distal end portion, a cross section of square geometry with a bottom, a top and two sides, a plurality of side support members of rectangular shape of predetermined length, width and gage, said side support members being symmetrically attached to opposing outside surfaces of the distal end portion of the beam, the side support members being located with one long edge in alignment with a lower edge of said beam and one short edge extending a predetermined distance past the distal end portion of the beam, a bore of predetermined diameter with a cylindrical axis perpendicular to the side support members passing through both side support members located a predetermined height from the lower edge of said beam predetermined distance from the distal end of said beam.

3. The tricycle carrier of claim 1, wherein the carrier beam member having a carrier beam of circular cross section of a predetermined diameter and a bore of a predetermined diameter with cylindrical axis perpendicular to and intersecting a cylindrical axis of the carrier beam at a predetermined distance from the proximal end portion of the carrier beam, a latch plate of prizmatic geometry of predetermined length and width, the latch plate being attached to the carrier beam member in a plane perpendicular to the cylindrical axis of the carrier beam, located by a point on the latch plate defined by one short edge and offset along the short edge from a midpoint of the short edge a predetermined distance, the point being in alignment with and centered on the cylindrical axis of the carrier beam at a predetermined distance from the distal end portion of the carrier beam, long edges of the latch plate being parallel the cylindrical axis of the bore of the proximal end portion of the carrier beam and extending to a left when viewed from the distal end portion of the beam.

4. The tricycle carrier of claim 1, wherein the carrier platform having a plurality of pivot blocks of predetermined length, width and height, each with a cylindrical bore of a diameter determined by the diameter of said carrier beam member aligned perpendicular to and centered one a surface defined by the length and height of the pivot block, said pivot blocks being attached to the bottom surface of each respective track with an axis of the bore in alignment with the pivot axis of the carrier platform, whereby the carrier platform is configured to be pivotally connected to the carrier beam member by insertion of the proximal end portion of the carrier beam member through each bore from a platform side with the pivot axis of the carrier platform to a left of the center of gravity of the carrier platform, insertion stopping when a latch plate contacts a first one of the pivot blocks.

5. The tricycle carrier of claim 1, further comprising a collar member of cylindrical geometry of a predetermined length, predetermined outside diameter and an inside diameter determined by a diameter of said carrier beam member, wherein said carrier platform is configured to be secured from movement along a cylindrical axis of the carrier beam member by sliding the collar over the proximal end portion of the beam member, stopping when the collar contacts a surface of a pivot block opposite a latch plate and said collar then being secured to the beam member.

6. The tricycle carrier of claim 1, further comprising a pivot shaft of the carrier beam member with a diameter determined by a bore diameter of the proximal end portion of the carrier beam member and of a predetermined length, a plurality of beam pivot thrust washers and means to secure the thrust washers onto the pivot shaft wherein said carrier beam member is configured to be pivotally connected to said tongue member by positioning the proximal end portion of the carrier beam member between support members of the tongue member with a cylindrical axis of the bore in the proximal end portion of the carrier beam member in alignment with a cylindrical axis of a bore in the support members, a latch plate projecting to a right when viewed from the distal end portion of the tongue member and inserting the pivot shaft through the aligned bores, sliding at least one of the thrust washers over an end of the pivot shaft and securing the thrust washers onto the end of the pivot shaft.

7. The carrier platform of claim 1, further comprising a plurality of straps of an elastic material and means to secure said straps to one side of the tracks, wherein one of said plurality of said straps is configured to be adjustably attached in proximity to a lower quadrant of each wheel of the tricycle, passed through spokes of each wheel and connected under tension to an opposite side of the track, whereby securing the tricycle to the platform.

* * * * *